US009241156B2

(12) United States Patent
Argyropoulos et al.

(10) Patent No.: US 9,241,156 B2
(45) Date of Patent: Jan. 19, 2016

(54) METHOD FOR ESTIMATING THE TYPE OF THE GROUP OF PICTURE STRUCTURE OF A PLURALITY OF VIDEO FRAMES IN A VIDEO STREAM

(75) Inventors: Savvas Argyropoulos, Berlin (DE); Bernhard Feiten, Berlin (DE); Marie-Neige Garcia, Berlin (DE); Peter List, Eppertshausen (DE); Alexander Raake, Berlin (DE)

(73) Assignee: DEUTSCHE TELEKOM AG, Bonn (DE)

( * ) Notice: Subject to any disclaimer, the term of this patent is extended or adjusted under 35 U.S.C. 154(b) by 487 days.

(21) Appl. No.: 13/812,871

(22) PCT Filed: Jul. 26, 2011

(86) PCT No.: PCT/EP2011/062797
§ 371 (c)(1),
(2), (4) Date: Apr. 10, 2013

(87) PCT Pub. No.: WO2012/013655
PCT Pub. Date: Feb. 2, 2012

(65) Prior Publication Data
US 2013/0219443 A1 Aug. 22, 2013

(30) Foreign Application Priority Data
Jul. 30, 2010 (EP) .................................. 10171431

(51) Int. Cl.
*H04N 11/02* (2006.01)
*H04N 17/00* (2006.01)
(52) U.S. Cl.
CPC ............. *H04N 17/00* (2013.01); *H04N 17/004* (2013.01)

(58) Field of Classification Search
None
See application file for complete search history.

(56) References Cited

U.S. PATENT DOCUMENTS

| | | | | |
|---|---|---|---|---|
| 6,411,738 B2 * | 6/2002 | Fert | ...................... | H04N 19/172 348/404.1 |
| 6,731,685 B1 * | 5/2004 | Liu | ........................ | H04J 3/1688 348/385.1 |

(Continued)

FOREIGN PATENT DOCUMENTS

| | | |
|---|---|---|
| CN | 1344106 A | 4/2002 |
| EP | 2077672 A1 | 7/2009 |

(Continued)

OTHER PUBLICATIONS

European Patent Office, International Search Report in International Patent Application No. PCT/EP2011/062797 (Sep. 28, 2011).

*Primary Examiner* — Christopher S Kelley
*Assistant Examiner* — Christopher Findley
(74) *Attorney, Agent, or Firm* — Leydig, Voit & Mayer, Ltd.

(57) ABSTRACT

A method for estimating the type of the GoP structure of a plurality of video frames in a video stream by estimating their frame types includes: capturing frame sizes in bytes of every video frame subsequent to an initial I-frame to obtain an array of frame sizes by exploiting features of a transport layer carrying the video stream; converting, after a number of frames, the array of frame sizes into an array of zeros and ones; matching the binarized array of frame sizes to a number of predefined short basic binary patterns, said predefined binary patterns depicting all GoP structures to be considered; converting the result of said matching to form a single score value; and determining the particular pattern of the number of predefined patterns of binaries having the best score value, according to a predefined metric.

19 Claims, 2 Drawing Sheets

(56) References Cited

U.S. PATENT DOCUMENTS

| | | | |
|---|---|---|---|
| 6,850,567 B1 * | 2/2005 | Frimout | G06T 1/0085 348/415.1 |
| 7,277,483 B1 * | 10/2007 | Eckart | H04N 19/176 375/240.03 |
| 7,706,384 B2 * | 4/2010 | van Beek | H04L 47/2416 370/395.4 |
| 8,208,536 B2 * | 6/2012 | Pun | H04N 19/159 375/240.03 |
| 8,311,344 B2 * | 11/2012 | Dunlop | G06K 9/00664 382/224 |
| 8,320,747 B2 * | 11/2012 | Ushiki | H04N 17/00 382/232 |

FOREIGN PATENT DOCUMENTS

| | | |
|---|---|---|
| WO | WO 2006114761 A1 | 11/2006 |
| WO | WO 2009012297 A1 | 1/2009 |
| WO | WO 2009012302 A1 | 1/2009 |

* cited by examiner

METHOD FOR ESTIMATING THE TYPE OF THE GROUP OF PICTURE STRUCTURE OF A PLURALITY OF VIDEO FRAMES IN A VIDEO STREAM

CROSS-REFERENCE TO RELATED APPLICATIONS

This application is a U.S. National Phase application under 35 U.S.C. §371 of International Application No. PCT/EP2011/062797, filed on Jul. 26, 2011, and claims benefit to European Patent Application No. EP 10171431.9, filed on Jul. 30, 2010. The International Application was published in English on Feb. 2, 2012 as WO 2012/013655 A1 under PCT Article 21(2).

BACKGROUND

Among the numerous TV distribution services, IPTV (Internet protocol TV) is becoming increasingly important and is more and more replacing analogue or non packet based transmission methods. It is a major responsibility of the broadcast provider towards both content provider and customer to maintain the quality of its service. In large IPTV networks only fully automated quality monitoring probes, that raise alarm in the case of the occurrence of degraded audio and/or video quality, can fulfill this requirement. These monitor probes should be able to estimate the subjective quality that an end user would perceive. Several models exist or are in development, that translate objective measurement results from a video bit stream into so called "mean opinion score" (MOS) values. The objective measurement categories that can be used to produce this MOS value will for instance include the bit rate and the frame rate of the monitored video.

It is an inherent property of IP-networks that (mostly due to temporal overload at some point in the network) IP packets may get lost. Some of these losses may be almost invisible to the customer while others may cause severe degradation of the video quality. Even if means against these losses are part of an IPTV distribution system, these means can never guarantee an effectiveness of 100%. For instance, a retransmission request may take too long, or the retransmitted packet itself might get lost.

Therefore there always is a non-zero probability, that fragmentary bit streams are transmitted to the end user device. These in turn can cause visible or audible degradations in the reconstructed video or audio. Measurement categories may therefore also include values to express the probability for losses. Such values may include the expression of a "packet loss rate" and the "burstiness of loss events".

In order to be able to estimate whether a packet loss will be invisible or, in the contrary be strongly visible even for long periods of time, it will be necessary to capture more properties of the monitored bit stream. The most important of these additional properties is the "frame type" of all frames and in particular the frame affected by losses. The possible values for the "frame type" property include "Intra-Frame" or "Key-Frame" (below called I-frame), "Predicted-Frame" (below called P-frame) and "Bidirectional-Frame" (below called B-frame). It is well known that only I-frames can be decoded without the knowledge of any prior frames. In the contrary, P-frames always depend on one or more predecessors called "reference frames", because the information transmitted for a P-frame mainly consists of the difference between the video-frame it describes and its references. Therefore, packet losses within an I-frame or its consecutive P-frames are carried into every subsequent frame, because the loss-effected I- and P-frames serve in general as references for subsequent frames. These frames become therefore degraded even if they do not contain any losses themselves.

Due to this mechanism, a single packet loss error may linger through long parts of a video sequence, until the next error free I-frame occurs. Errors in P-frames and particularly in I-frames may therefore have a very high visibility.

The same reference frame mechanism is true for B-frames, but, since B-frames in general do not serve as references themselves, an error in a B-frame will only be visible in this single frame and hence be much less visible compared to errors due to losses in I or P-frames.

Since I-frames do not depend on any prior references, they represent the only points in a bit stream, were a video player or settop box can sync up with the video. Also, (loss free) I-frames are the only points in time to wipe out any degradation due to packet losses. The sequence of video frames between two I-frames is called "Group of Pictures" (GoP). In most of the cases P and B-frames in a GoP follow a more or less strict pattern like the typical GoP-pattern known from MPEG2: "I, B, B, P, B, B, P . . . ". If this pattern is known, a reliable a priori estimation of the frame type of any picture in the bit stream is possible, even if the frame type itself can not be read from the bit stream due to packet loss or encryption.

Often times it is quite demanding to get good estimations for the above mentioned and other measurement values. This is mainly due to two independent reasons:

1. To prevent unauthorized access, the bit stream might be encrypted and important bit stream properties might not be readable at the measurement location.

2. Due to packet loss as mentioned above, important pieces of information might have been removed from the bit stream.

In WO 2009/02297 and WO 2009/012302 the "pattern" of the GoP is solely determined by independently estimating the frame-type of every individual video-frame with the aid of adaptive threshold values that discriminate between video-frames with very large size (I-Frames), medium size (P-frames) and small size (B-frames). Since I-frames contain on average twice to 5 times as many bits as P-frames or B-frames, it is easy to distinguish I-frames from P- and B-frames. It is rather unreliable though, to distinguish P-frames from B-frames. Although B-frames are on the average smaller than P-frames, the difference in size is not large, instead, the size variance of P- and B-frame sizes is. In general, average differences in size also depend a lot on the specific encoder, used to compress the examined video sequences and on the specific properties of this sequence. This is even more the case for a new encoding strategy of H.264 encoders called "hierarchical coding", were some of the B-frames also serve as reference for other B-frames.

EP-A-2 077 672 relates to analyzing the transport stream such as to estimate the frame-types of an encoded video signal. In a first embodiment the "pattern" of the GoP is determined by determining the local size-maximum of a small number of consecutive video-frames, where the video-frame with the maximum size is considered P-frame, if the so calculated small/large relationship matches predefined "determination frame patterns". All other frames are considered B-frames.

In a second embodiment frames are estimated as P-frames, if they exceed a threshold calculated as the average of a number of preceding frames multiplied by a factor larger one (e.g. 1.2). If this first calculation fails, which is supposed to detect the open-GoP B,B,P pattern, similar threshold based tests are done that depict other GoP-patterns. Since these tests are performed sequentially, and the first success is taken as the final result, a mismatch in the beginning of the tests chain can not be corrected by following tests.

All frame-type estimations of former art rely on the assumption that P-frames always have a sufficiently larger size than the temporally surrounding B-frames of the sequence. In reality this is not always the case. Only the average values of frame-type sizes reliably match this assumption.

Therefore it is favorable to detect the general GoP-structure by statistical means and apply this knowledge to individual frames, if the discrimination of frame-types by their size is unreliable or ambiguous as done in the present invention.

SUMMARY

In an embodiment, the present invention provides a method for estimating the type of the Group of Picture (GoP) structure of a plurality of video frames in a video stream by estimating their frame types. The method includes the steps of: a) capturing frame sizes in bytes of every video frame subsequent to an initial Intra-frame (I-frame) to obtain an array of frame sizes by exploiting features of a transport layer carrying the video stream; b) converting, after a number of frames, the array of frame sizes obtained in step a) into an array of zeros and ones, where zero stands for small frame sizes, as assumed for bidirectional frames (B-frames), and one stands for large frame sizes, as assumed for predicted frames (P-frames); c) matching the binarized array of frame sizes obtained in step b), which contains a specific repeated short basic binary pattern that is characteristic to the GoP structure to be analyzed, to a number of predefined short basic binary patterns, said predefined binary patterns depicting all GoP structures to be considered; d) converting the result of said matching in step c) to form a single score value; and e) determining the particular pattern of the number of predefined patterns of binaries having the best score value, according to a predefined metric.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
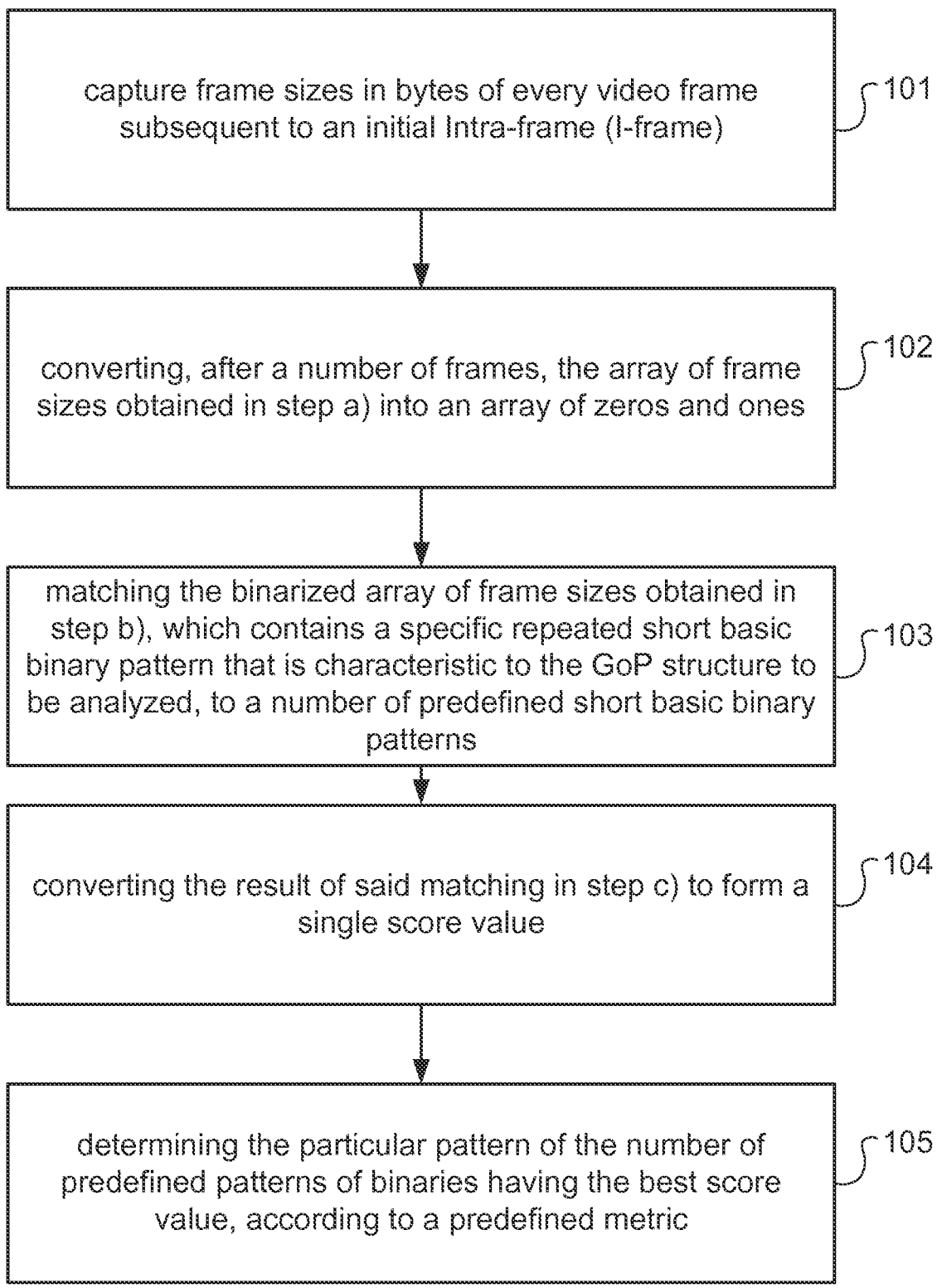
FIG. 1 is a flowchart depicting an exemplary method for estimating the type of the Group of Picture (GoP) structure of a plurality of video frames in a video stream by estimating their frame types according to an exemplary embodiment.

FIG. 1 is a flowchart depicting an exemplary method for estimating the type of the Group of Picture (GoP) structure of a plurality of video frames in a video stream by estimating their frame types according to an exemplary embodiment. The exemplary method includes: a) capturing frame sizes in bytes of every video frame subsequent to an initial Intra-frame (I-frame) to obtain an array of frame sizes by exploiting features of a transport layer carrying the video stream (stage 101); b) converting, after a number of frames, the array of frame sizes obtained in step a) into an array of zeros and ones, where zero stands for small frame sizes, as assumed for bidirectional frames (B-frames), and one stands for large frame sizes, as assumed for predicted frames (P-frames) (stage 102); c) matching the binarized array of frame sizes obtained in step b), which contains a specific repeated short basic binary pattern that is characteristic to the GoP structure to be analyzed, to a number of predefined short basic binary patterns, said predefined binary patterns depicting all GoP structures to be considered (stage 103); d) converting the result of said matching in step c) to form a single score value (stage 104); and e) determining the particular pattern of the number of predefined patterns of binaries having the best score value, according to a predefined metric (stage 105).

Figure 2:
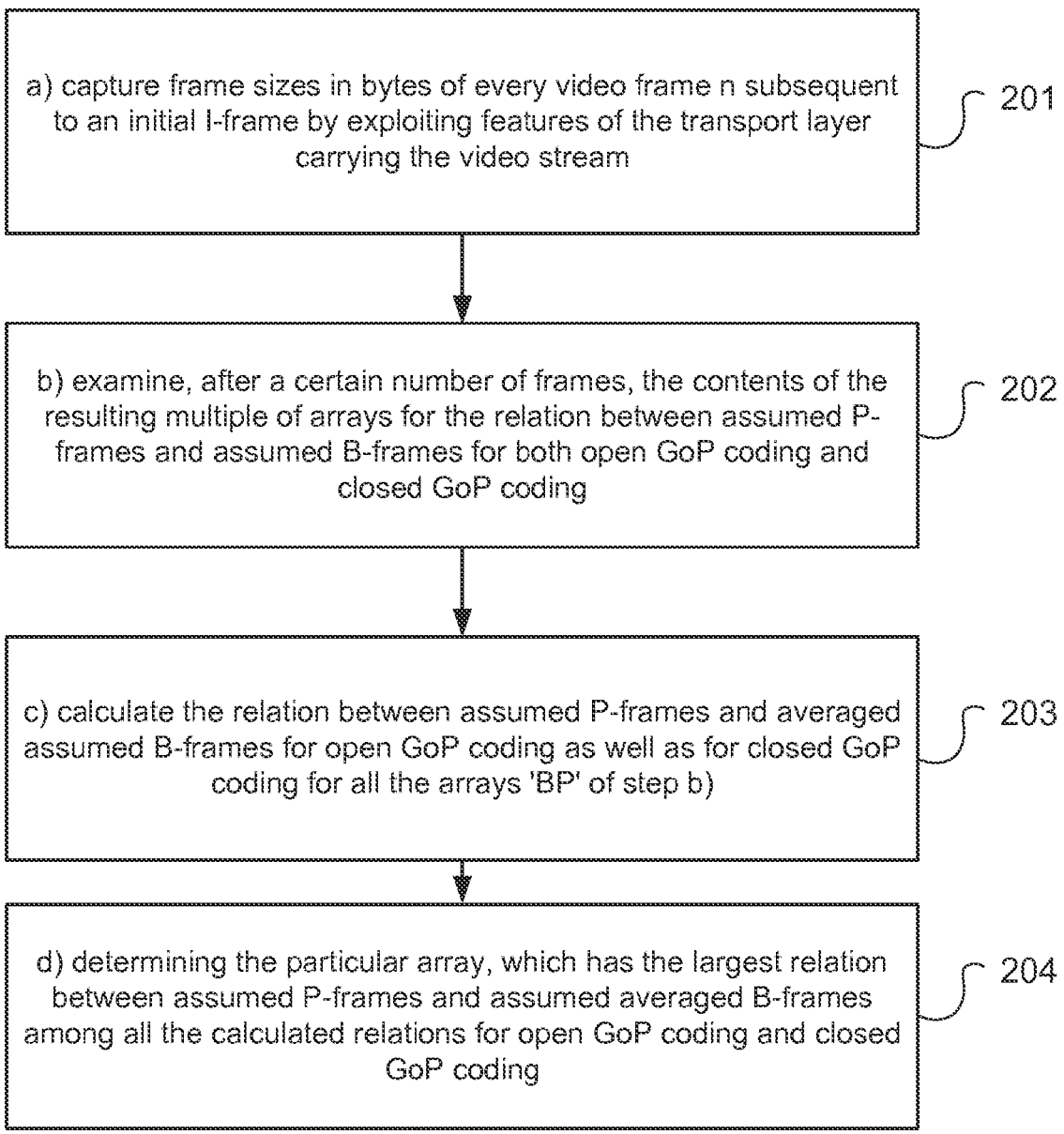
FIG. 2 is a flowchart depicting a method for estimating the type of the Group of Picture (GoP) structures of a plurality of video frames in a video stream by estimating their frame types according to another exemplary embodiment.

FIG. 2 is a flowchart depicting a method for estimating the type of the Group of Picture (GoP) structures of a plurality of video frames in a video stream by estimating their frame types according to another exemplary embodiment. The exemplary method includes:

a) capturing frame sizes in bytes of every video frame n subsequent to an initial I-frame by exploiting features of the transport layer carrying the video stream, where the size of every frame n is added to a specific element of each array, Array[BP], of a multiple of arrays, where each array of these multiple of arrays has a different size, ArraySize[BP], equal to the length of the basic frame type pattern, BP, of each considered GoP structure, where the specific element in which the frame size of frame n is added up is the (n % ArraySize[BP])'th element of each array, Array[BP], and where the number of frame sizes added up in every element of every array is noted, which is depicted by the following symbolic code assuming Array and ArrayCount have meaningful content:

```
for ( every frame n within the measurement period )
    for ( every considered basic pattern BP )
    {
        Array[BP] [ n % ArraySize[BP] ]         += Framesize[n]
        ArrayCount[BP][ [ n % ArraySize[BP] ] += 1
    }
``` with the result that only in the one specific array, representing the true GoP-structure to be detected, P-frames have always been added up with other P-frames and B-frames have always been added up with other B-frames; (stage 201)

b) examining, after a certain number of frames, the contents of the resulting multiple of arrays for the relation between assumed P-frames and assumed B-frames for both open GoP coding and closed GoP coding, which are for a specific basic pattern both represented by the same array where a first step for this examination consists of a division of each element of each array by the number of added up frame sizes in this element as depicted in the symbolic code below:

```
for ( every considered basic pattern BP )
    for ( every element i in Array[BP] )
        Array[BP] [i] = Array[BP] [i] / ArrayCount[BP] [i] ; (stage 202)
``` c) calculating the relation between assumed P-frames and averaged assumed B-frames for open GoP coding as well as for closed GoP coding for all the arrays 'BP' of step b); (stage 203) and d) determining the particular array, which has the largest relation between assumed P-frames and assumed averaged B-frames among all the calculated relations for open GoP coding and closed GoP coding (stage 204).

In an embodiment, the present invention provides a method to estimate the frame-types of video frames in encrypted video streams, or in cases where the bit stream properties, which contain information about the frame type (the slice header), have gone missing due to packet loss.

In particular, a method is provided for the estimation of frame types that is not only based on their size. Instead, the GoP pattern of the examined video bit stream is estimated by a pattern matching of the encountered frame sizes in each GoP to typical predefined GoP patterns. With the knowledge of this estimated GoP-pattern the type of every subsequent frame can be estimated.

According to a first aspect, the invention provides a method for estimating the type of the Group of Picture structure, GoP, of a plurality of video frames in a video stream.

In step a), the boundaries of video frames in the bitstream may be detected by either observing the changes in certain timestamps of the transport layer, or by certain bits in the header structures that are used to signal new frames and decide Intra-frames from other frames.

It is preferred that in step a) the number of frames captured for one measurement period comprises all frames until the next I-frame.

In step b) the conversion of the continues frame sizes to binaries preferably comprises the usage of a reference value that is dependant on constant or slowly fluctuating features, or a dynamically adaptive reference value, which are preferably dependent on the values of previously captured frame sizes and/or other dynamic features.

The predefined basic patterns of binaries depict possible GoP structures for different numbers of consecutive B-frames in frame based coding, field based coding, open GoP coding, or closed GoP coding.

It is preferred in step c) that the short predefined basic patterns are repeated with a possible truncation of the last basic pattern until the series of repeated basic patterns has the same length as the series of binarized frame sizes in the array of frame sizes.

Furthermore, in step c) the matching may be performed by an element wise exclusive nor operation, wherein in step d) the results of every exclusive nor is added up to form the score value, and wherein in step e) the score value metric corresponds to the maximum value.

According to an embodiment, in step e) for the pattern having the best score value the associated GoP-structure, field/frame status and open GoP/closed GoP status are selected as estimation result for the GoP-pattern of the current GoP.

Preferably, for subsequent GoPs either new series of frame sizes are captured, or any kind of GoP averages are being used by averaging frame sizes of previous and current arrays of frame sizes.

After the estimation of the GoP-pattern a further frame type classification is performed, in order to detect the presence of Reference B-frames within the detected Group of Pictures structure.

According to a second aspect, the invention provides an alternative method for estimating the type of the Group of Picture, GoP, structures of a plurality of video frames in a video stream.

It is preferred that the number of frames n in step a) captured for one measurement period, comprises all frames until the next Intra-frame.

In step c) for every array two relation values are produced as described below:

i) if the examined video stream comprises of open GoP coding, the assumed P-frame of the basic pattern that each of the arrays BP represent, would be located in the last element of said arrays BP and all other elements of said arrays would be occupied by B-frames so that the relation for open GoP coding streams is calculated as the last array element divided by the average of all other array elements, or ii) if the examined video stream comprises of closed GoP coding, the assumed P-frame of the basic pattern that each of the arrays BP represent, is located in the first element of said arrays BP and all other elements of said arrays would be occupied by B-frames so that the relation for closed GoP coding streams is calculated as the first array element divided by the average of all other array elements.

Preferably, after the estimation of the GoP-pattern a further frame type classification is performed wherein the subset of B-frames in the array representing the estimated GoP-structure according to step c) is examined as to whether the averaged frame sizes according to the result of step b) for those elements in said array that may contain reference B-frames are significantly larger than all the other elements containing B-frames in said array, and, if this is the case, said frames are then assumed to be reference B-frames and the estimated GoP-structure is assumed to be a GoP-structure of a so called hierarchical coding sequence.

The estimated GoP structure serves as an estimate for the following GoP-structures, wherein this estimated GoP-structure serves as aid to detect video frame losses due to packet losses, or to labeling lost or present frames with their specific frame-type.

In a first step, the number of bytes for each video frame is estimated or calculated. Different methods may be appropriate to perform this task. For instance, the changes in certain timestamps in the transport layer can be exploited to detect the beginning of new frames, or certain bits in the header structures that are used to signal new frames may be utilized. In general these bit stream properties are available even in encrypted bit streams. Therefore, the fame sizes can either be calculated byte exact, or estimated well enough to perform the following steps.

In a second step, the video bit stream is scanned until the next I-frame is found, which represents the start of the next GoP.

In non-encrypted streams, the next I-frame (as all of the frame types) can be found by looking into the video-frame header. In encrypted streams, or if frame boundaries appear somewhere at unknown points within the payload, certain flags can be accessed instead, that mark I-frames as "random access points". If for some reason theses flags do not appear, still an analysis of encountered frame sizes can be used to detect I-frames, since their size is in general much bigger than those of P and B-frames.

In a third step, the sizes in byte of all subsequent video frames until the next I-frame will be captured in certain arrays until the next I-frame is encountered and therefore the GoP is completed.

In a fourth step these arrays will be matched to a number of predefined patterns that represent typical GoP structures. The best match is associated to a specific GoP structure which will in later steps serve as prototype for following GoPs and can therefore enable an easy a priori estimation of frame types of incoming frames.

For subsequent GoPs, the array of frame sizes may be reset, so that only data of the current GoP is used, or the frame sizes of a certain number of previous GoPs may be added up to obtain averaged values. In the latter case an additional array may be needed to note the number of frame size values added up in the elements of the array. Preferably, moving averages may be calculated, by applying:

for (all frames n within the current GoP)

FrameSizeArray[n]=(M−1)/M*FrameSizeArray[n]+1/M*FrameSize[n]

where M is the number of GoPs to be averaged.

Different weighting schemes may be used according to the invention.

Possible GoP Patterns

As stated above, a GoP usually has a specific structure that is composed of a certain sequence of P- and B-frames between the two I-frames which mark the boundaries of the GoP. Examples for typical GoP-structures are:

I,b,b,P, b,b,P, b,b,P . . . . (the "classical" GoP-structure known from MPEG2)

I,b,B,b,P, b,B,b,P, b,B,b,P (possible GoP-structure for hierarchical encoding, with B=reference B-frame b=non reference B-frame)

It has to be taken into account that interlaced video is often encoded as "field sequence" comprising two independent fields for one video frame. In that case the above structures would look like:

I/P, b/b,b/b,P/P, b/b,b/b,P/P . . . .
I/P, b/b,B/B,b/b,P/P, b/b,B/B,b/b,P/P . . . .

forming distinct patterns that, if correctly detected, allow the decision between frame and field encoding even in encrypted streams. It is noted here that in field sequences often times only the first field of a key frame is actually coded as intra field. The second field of the key-frame may be a predicted field. In the above notation this would result in a I/P frame. Even P/I frames are possible.

The patterns above are visualized in "display order". In fact, the frames are transmitted in a different order, the so called "bit stream order" or "decoding order". Since B-frames have references in the past and the future, these future references have to be transmitted in advance resulting in a bit stream order as shown below:

$I_0, P_1, b_2, b_3, P_4, b_5, b_6, P_7, b_8, b_9$ . . . bit stream order
$I_0, b_2, b_3, P_1, b_5, b_6, P_4, b_8, b_9, P_7$ . . . display order (with bit stream order index)
$I_0, P_1, B_2, b_3, b_4, P_5, B_6, b_7, b_8, \ldots$ bit stream order
$I_0, b_3, B_2, b_4, P_1, b_7, B_6, b_8, P_5, \ldots$ display order (with bit stream order index)

Even for the same GoP-structure different patterns are possible. This is because there are the techniques of "closed GoP transmission" and "open GoP transmission".

In closed GoPs, the transmission of the content of different GoPs never overlaps. In open GoP-structures the first I-frame is transmitted before the B-frames preceding it in display order (the ones that are closing the preceding GoP). The examples above were shown in closed GoP fashion. The same example in open GoP fashion would look like:

$b_{-2}, b_{-1}, I_0, b_2, b_3, P_1, b_5, b_6, P_4, \ldots$ display order (open GoP)
$I_0, b_{-2}, b_{-1}, P_1, b_2, b_3, P_4, b_5, b_6, \ldots$ bit stream order
$b_{-3}, B_{-2}, b_{-1}, I_0, b_3, B_2, b_4, P_1, b_7, B_6, b_8, P_5$ . . . display order (open GoP)
$I_0, B_{-2}, b_{-3}, b_{-1}, P_1, B_2, b_3, b_4, P_5, B_6, b_7, b_8$ . . . . bit stream order with the first two (three) B-frames (here marked in bold letters) belonging to the preceding GoP, which are transmitted after the I frame of the current GoP.

As can easily be seen, the bit stream order and therefore the resulting GoP-pattern differ in a distinct manner that, if correctly detected, allows the decision between closed GoP and open GoP sequences.

Other possible patterns include:

I,P,P,P,P . . . . (GoP-structure without B-frames like used in video conferencing and other low delay applications)
I, b,P, b,P, . . . . (GoP-pattern with only one B-frame)

It is within the scope of the invention to estimate the GoP-structure of any analyzed video stream, may it be fully readable, encrypted or corrupted by packet loss. The only information needed to achieve this goal is the sizes in byte of every encountered video frame and the knowledge which of the frames are of type I-frame.

Calculation/Estimation of Frame Sizes

As this invention is based on the analysis of the byte sizes of all the frames in a video sequence, these sizes have to be extracted from the bit stream for every frame. There are many different transport schemes, which may require different actions to perform this task. The by far most important transport scheme on IP based networks is the "real time protocol" (RTP) however. Frame size extraction is therefore here described for RTP only but will work similarly for other transport schemes. The skilled person will be able to easily adopt the invention to any different transport scheme of his usage.

There are two major approaches to transmit video content over RTP:

The video is carried directly as a payload of the RTP packets. In this case audio and other possible information ("system" information) is carried in different RTP-streams having different port numbers. Therefore the video portion of the bit stream can easily be separated from the rest of the packets.

One video frame will in general consist of the payload of a number of RTP packets, each of which is carrying a timestamp. In the case of video, these RTP-timestamps are set to the relative decoding time of the video frame they carry. Since RTP packets can each have different sizes, a video frame will in general be in a number of complete RTP-packets. To calculate the size of a video fame in this case, only the payload sizes of all RTP-packets with the same timestamp have to be added up.

Even if frame boundaries appear within a single RTP-payload, frame sizes can be estimated quite well by the above value. No access to the payload itself, which might be encrypted, is necessary.

The RTP-sequence number, which is part of the RTP-header, can be accessed in order to detect RTP-packet losses. Since the size of a lost packet cannot be known, it needs to be estimated. This can be done by some kind of average size of past packets.

Video is carried over RTP, but the payload is a "transport stream" (TS). In a TS, video, audio and other information is multiplexed into a single stream. Each of the multiplex packets have a size of 188 byte including the small TS-header. One RTP-packet carries 7 of these TS-packets, which are marked by the so called "program ID" (PID) as belonging to a specific sub stream. One of theses sub streams is the video to be analyzed. Even in encrypted streams, the TS-headers are in general not encrypted, and can therefore be accessed. They allow for an exact measurement of frame sizes. In case of RTP-packet losses, a so called "continuity counter" within the TS-header can be utilized to calculate the number of lost sub stream-packets separately for each sub-stream for the particular RTP-loss. Since TS-packets are much smaller than RTP-packets, and (in absence of the rare case of stuffing) have the same payload size, the number of lost bytes can be estimated more accurate. The mentioned continuity counter in the TS-header has only 4 bits. Therefore up to 16 missing TS-packets can be detected. Together with the known number of missing RTP packets and a value for the average number of TS-sub stream packets per RTP packet which can easily be calculated, an accurate estimation for lost TS-packets larger than 16 can be estimated.

Since the RTP timestamp is synchronized to the relative decoding time of the video frame they carry, even complete missing frames can be detected, because in such a case the RTP-timestamp would be incremented by more than one time difference between successive frames.

Detection of I-Frames

In order to start analysis, the bit stream is scanned to find the beginning of the next I-frame, which marks the beginning of a new GoP. I-frames can be detected by different means. In case of a non encrypted stream, the frame headers of the elementary stream may easily be accessed for all video-frames. Video frame headers explicitly contain the frame type.

If the video is carried directly as RTP-payload, frame-headers should always appear with the first byte in the payload of every RTP-packet coming after an RTP-packet with the M-bit of the RTP-header set to 1. If frame headers may appear as well within the payload of an RTP-packet, they can easily be searched for, because they contain a unique byte sequence.

In the case that TS over RTP is used, the so called "random_access_flag" within the adaptation-field of the TS-header can be exploited. It signals that the coming frame was coded as I-frame. Even in encrypted streams the adaptation field as part of the TS-header is usually not encrypted.

Once frame boundaries are known, I-frames can also be detected empirically. Their average size is usually much bigger than those of P and B-frames.

Once the beginning of an I-frame is found, the beginning of the next GoP is found as well. From that point on the sizes of all subsequent frames are gathered in a number of possible ways. In the following description this gathering process is continued for a complete GoP until the analysis of the gathered data is started. In other embodiments of the invention the collecting period can have a different length.

First Embodiment of Data Collecting and Pattern Matching

One Long Array of Frame Sizes

After the initial I-frame of the current GoP has been encountered, the frame sizes of all subsequent frames are stored into the elements of an array, with the index of the array equal to the number of frames past said I-frame. This is preferably done until the next I-frame is detected, signaling the end of the first GoP to be analyzed. The so constructed array of frame sizes is the input to a pattern matching process that compares this array to a set of typical patterns, and outputs an estimated GoP-pattern and other data where applicable.

If the analyzed bit stream is not encrypted, and therefore the frame types are known to the algorithm, the real frame sizes can be replaced by standardized values like '1' for non-reference B-frames, '2' for reference B-frames and '4' for P-frames, which serve the same purpose as the real frame sizes, but do not introduce any statistical uncertainty.

Pattern Matching

In an embodiment of the invention, the array of frame sizes would be matched to binary patterns with '0' for B-frames and '1' for P-frames. The example GoP-structures above would therefore be matched to patterns like:

0,0,1, 0,0,1 . . . (I, b,b,P, b,b,P structure with open GoP)
1,0,0, 1,0,0 . . . (I, b,b,P, b,b,P structure with closed GoP)
0,0,0,1, 0,0,0,1 . . . (I, b,B,b,P, b,B,b,P structure with open GoP)
1,0,0,0, 1,0,0,0 . . . (I, b,B,b,P, b,B,b,P structure with closed GoP)

In this embodiment of the invention, the "array of frame sizes" would therefore be converted into a binary array as well. In the easiest case, a single reference value would be used to replace the values of every element of said array into '0' for "small sized frame(s)" and '1' for "large frame(s)". The reference value to decide between "large" and "small" could simply be the average of all elements multiplied by a factor >1. In alternative embodiments the threshold could be the median value of all array elements or a weighted combination of the smallest and largest of the elements or other combinations of the array elements. Also, the threshold could be adopted for a small number of frame size values. This could be accomplished by varying one of the described threshold values by a factor or an additive term or by calculating the threshold only from frame size values in a certain neighborhood of the current value.

In general it may be reasonable not to use the first few values in the array, because immediately after an I-frame P- and B-frames often times have irregularly small sizes.

Matching Process

The length of a GoP is in general not known in advance. Typical values are one I-frame per every 1 or 2 seconds, resulting in a GoP length of for instance 25 to 50 frames (or 50 to 100 fields for "field coding" modes) for the typical frame rate of 25 frames / sec. Usually the encoder has a scene-cut detection and places an I-frame on every scene-cut position. Therefore, if scene-cuts are encountered, GoP's can have any size down to 2 or even 1 frame.

In contrast to overall length, the basic patterns of each of the possible GoP structures are constant and short (for instance 0,0,1 for the I, b,b,P, . . . example). For the purpose of matching with the elements of a complete GoP, these simple basic patterns have to be repeated until the actual GoP-size is reached.

In embodiments of the invention where only binary matching is applied, the matching process itself may be a simple "exclusive nor" operation on every element of the converted array of frame sizes with the concatenated basic pattern elements. The results of these "exclusive nor" operations are then added up to a matching score for the used pattern. This is done with all available predefined patterns.

The specific pattern, which gains the highest score number, is considered the best match and its associated GoP-structure, frame/field-status, open/closed-status are than adopted for further analysis.

Differentiating Between Hierarchical Coding and Conventional B-Frame Coding

In the case that more than two consecutive B-frames are estimated in the best matching GoP-pattern, it is likely that the sequence of frames had been coded with the "Hierarchical Coding" method with reference B-frames as mentioned above. If this is the case it is likely that these reference B-frames have a larger frame size in bytes than the non reference B-frames (above labeled as b-frames).

To gain a reliable estimation whether hierarchical coding or non hierarchical coding is used, every subset of consecutive B-frames (between two P-frames) may be examined whether the frame sizes for those elements in the subset standing for reference B-frames are significantly larger than all the other elements representing B-frames in said subset. In case of 3 consecutive B-frames this is the first subset element, in case of 5 consecutive B-frames these are the first and the second subset elements. In case of 7 consecutive B-frames these are the first, second and third subset elements (in decoding order). Other combinations are very unlikely for hierarchical coding. If this condition is true for the magnitude of sets of consecutive B-frames a GoP, hierarchical coding can be assumed.

For patterns with more than 3 B-frames hierarchical coding may be assumed even without the described test, since more than three B-frames in a row without hierarchical coding is extremely unlikely.

Applying the resulting estimated GoP-structure to the frames of following GoP's results in a reliable estimation of frame types of these frames, when the sequence is encrypted, or frame headers are missing due to packet loss.

Second Embodiment of Data Gathering and Pattern Matching

Multitude of Short Arrays of Averaged Frame Sizes

Since the number BP of possible basic patterns is limited, the invention could be modified so that there would be exactly one array per possible basic pattern instead of the single array as described above. These arrays would have the short size of their basic pattern. For instance: The array for the GoP-structure "I,b,b,P" with its pattern 0, 0, 1 for open GoP coding or 1, 0, 0, for closed GoP coding would have a size of 3.

Let n be the number of frames past the initial I-frame. By adding up the byte sizes of every encountered frame n into the n % ArraySize[BP]'th element of each Array[BP], (n % ArraySize[BP] meaning, reminder of n/ArraySize[BP]) and counting their number per element, average frame size values can be generated in the elements of each array.

Only in one specific array that is associated to the true GoP-structure though, P-frames have exclusively been added up with P-frames and B-frames have exclusively been added up with B-frames. Therefore, only in exactly this array the true average relation between P and B frames is reflected in its elements. The elements of all other arrays contain a mixture of P- and B-frame sizes. So, the relation between them will be much less significant.

The following pseudo code clarifies, how the frame size of frame n after the initial I-frame is added to the elements of said arrays:

```
for( every frame n within the measurement period)
    for ( every considered basic pattern BP )
    {
        Array      [BP] [ n % ArraySize[BP] ]   += Framesize[n]
        ArrayCount[BP] [ n % ArraySize[BP] ]   += 1
    }
```

The considered GoP-patterns may include patterns for frame based coding and field based coding, where the latter ones have twice the number of elements.

Pattern Matching

After all the frame sizes of for instance one GoP have been added up in the arrays, they are examined In a first step the average frame size in each element of each array is calculated by dividing all elements of each array by the number of item it contains.

```
for ( every considered basic pattern BP )
    for( every element i in Array[BP] )
        ArraySize[BP][i] = ArraySize[BP][i] /ArrayCount[BP].
```

For the purpose of matching, the two cases of "open GoP coding" and "closed GoP coding" as described above, have to be differentiated. For "closed GoP coding", the first element of the array reflecting the true GoP-pattern will contain all the averaged P-frame sizes, whereas "open GoP coding" the last element contains all the averaged P-frame sizes. The following pseudo code summarizes how the relations for every possible GoP-pattern and for "open GoP coding" (OG) / "closed GoP coding" (CG) are obtained:

```
for ( every considered basic pattern BP )
    {
        CG_Relation[BP] = Array[BP][0] /(ΣArray[BP][i]
        /[ArraySize[BP]-1])
                                    with i = 1...ArraySize[BP]-1
        OG_Relation[BP] = Array[BP][ArraySize[BP]-1]/(Σ Array [BP][i]
        /[ArraySize[BP]-1])
                                    with i = 0...ArraySize[BP]-2
    }
```

In a further step, the maximum value of all the elements in OG_Relation[ ] and CG_Relation[ ] is searched. The pattern BP that corresponds to this maximum value is than considered the best match, and its associated GoP-structure is considered to be the true GoP-structure of the analyzed video sequence. Also, its Field/Frame and Open/Closed status is considered to be the sequence' true status.

The advantage of this embodiment of the invention is the absence of any predefined, pre calculated or "calculated on the fly" variable, that may serve as reference value, or for any other purpose. Therefore no additional statistical uncertainties are introduced into this second embodiment of the algorithm.

Differentiating Between Hierarchical Coding and Conventional B-Frame Coding

In the case that more than two consecutive B-frames are estimated in the best matching GoP-pattern, it is likely that the sequence of frames had been coded with the "Hierarchical Coding" tool with reference B-frames as mentioned above. If this is the case it is likely that these reference B-frames have a larger frame size in bytes than the non reference B-frames (above also labeled as b-frames).

To gain a reliable estimation whether hierarchical coding or non hierarchical coding is used, the elements of the best matching array representing the averaged non reference b-frames have to be compared with the array elements representing the averaged reference B-frames. The latter elements should be significantly larger than the elements representing the averaged non reference B-frames. In the example with 3 B-frames the corresponding array would look like:

Open GoP: [B],[b],[b],[P]

Closed GoP: [P],[B],[b],[b]

Applying the so estimated GoP-structure to the frames of following GoP's results in a reliable estimation of these frames, when the sequence is encrypted, or frame headers are missing due to packet loss.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

Furthermore, in the claims the word "comprising" does not exclude other elements or steps. A single unit may fulfill the functions of several features recited in the claims.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B." Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise.

The invention claimed is:

1. A method for estimating the type of the Group of Picture (GoP) structure of a plurality of video frames in a video stream by estimating their frame types, comprising the steps of:
   a) capturing frame sizes in bytes of every video frame subsequent to an initial Intra-frame (I-frame) to obtain an array of frame sizes by exploiting features of a transport layer carrying the video stream;
   b) converting, after a number of frames, the array of frame sizes obtained in step a) into an array of zeros and ones, where zero stands for small frame sizes, as assumed for bidirectional frames (B-frames), and one stands for large frame sizes, as assumed for predicted frames (P-frames);
   c) matching the binarized array of frame sizes obtained in step b), which contains a specific repeated short basic binary pattern that is characteristic to the GoP structure to be analyzed, to a number of predefined short basic binary patterns, said predefined binary patterns depicting all GoP structures to be considered;
   d) converting the result of said matching in step c) to form a single score value; and
   e) determining the particular pattern of the number of predefined patterns of binaries having the best score value, according to a predefined metric.

2. The method of claim 1, wherein in step a) the boundaries of video frames in the bitstream are detected by either observing the changes in certain timestamps of the transport layer, or by certain bits in the header structures that are used to signal new frames and decide Intra-frames from other frames.

3. The method of claim 1, wherein in step b) the number of frames comprises all frames until the next I-frame.

4. The method of claim 1, wherein in step b) the conversion of the frame sizes to binaries comprises the usage of a reference value, that is dependant on constant or fluctuating features of the video sequence to be analyzed, or a dynamically adaptive reference value.

5. The method of claim 4, wherein the dynamically adaptive reference value is dependent on at least one of the values of previously captured frame sizes or other dynamic features of the video sequence to be analyzed.

6. The method of claim 1, wherein said predefined short basic binary patterns depict possible GoP structures for different numbers of consecutive B-frames in frame based coding, field based coding, open GoP coding, or closed GoP coding.

7. The method of claim 1, wherein for the matching in step c) the predefined short basic binary patterns are repeated with a possible truncation of the last basic pattern until the series of repeated basic patterns has the same length as the series of binarized frame sizes obtained from the array of frame sizes.

8. The method of claim 1, wherein in step c) the matching is performed by an element-wise exclusive NOR or by an element-wise exclusive OR operation, wherein in step d) the results of every exclusive NOR or exclusive OR is added up to form the score value, and wherein in step e) the score value metric corresponds to the maximum or minimum value, respectively.

9. The method of claim 1, wherein in step c) for the pattern having the best score value the associated GoP-pattern, field/frame status and open GoP/closed GoP status are selected as estimation result for the GoP-structure of the current series of analyzed frames.

10. The method of claim 1, wherein for GoP-structure estimation of subsequent GoPs either new arrays of frame sizes are captured for each of the subsequent GoPs, or any kind of average of the elements of current and previous arrays of frame sizes arc being used.

11. The method of claim 1, wherein after the estimation of the GoP-pattern a further frame type classification, is performed, wherein every subset of consecutive B-frames between two P-frames is further examined as to whether the relation of frame sizes according to the output of step a) for those elements in said subsets that may contain reference B-frames to those elements that may only contain non-reference B-frames is larger than a threshold value, which is sufficiently larger than 1,as reference B-frames are assumed to be on average larger than non-reference B-frames, and wherein, if this is the case for a statistically significant number of said subsets of B-frames in the array of frame sizes, said frames are then assumed to be reference B-frames and the estimated GoP-structure is assumed to be a GoP-structure of a so called hierarchical coding sequence.

12. The method of claim 8, further comprising the step of using the estimated GoP structure as an estimate for the following GoP-structures, and using this estimated GoP-structure as aid to detect video frame losses due to packet losses, or to label lost or present frames with their specific frame-type.

13. A method for estimating the type of the Group of Picture (GoP) structures of a plurality of video frames in a video stream by estimating their frame types, comprising the steps of:
   a) capturing frame sizes in bytes of every video frame n subsequent to an initial I-frame by exploiting features of the transport layer carrying the video stream, where the size of every frame n is added to a specific element of each array, Array[BP], of a multiple of arrays, where each array of these multiple of arrays has a different size, ArraySize[BP], equal to the length of the basic frame type pattern, BP, of each considered GoP structure, where the specific element in which the frame size of frame n is added up is the (n % ArraySize[BP])'th element of each array, Array[BP], and where the number of frame sizes added up in every element of every array is noted, which is depicted by the following symbolic code assuming Array and ArrayCount have meaningful content:

```
for ( every frame n within the measurement period )
    for ( every considered basic pattern BP )
    {
        Array[BP] [ n % ArraySize[BP] ]         += Framesize[n]
        ArrayCount[BP][ [ n % ArraySize[BP] ] += 1
    }
``` with the result that only in the one specific array, representing the true GoP-structure to be detected, P-frames have always been added up with other P-frames and B-frames have always been added tip with other B-frames;
   b) examining, after a certain number of frames, the contents of the resulting multiple of arrays for the relation between assumed P-frames and assumed B-frames for both open GoP coding and closed GoP coding, which are for a specific basic pattern both represented by the same array where a first step for this examination consists of a division of each element of each array by the number of added up frame sizes in this element as depicted in the symbolic code below;

```
for ( every considered basic pattern BP )
    for ( every element i in Array[BP] )
        Array[BP] [i] = Array[BP] [i] /ArrayCount[BP] [i] ;
``` c) calculating the relation between assumed P-frames and averaged assumed B-frames for open GoP coding as well as for closed GoP coding for all the arrays 'BP' of step b); and d) determining the particular array, which has the largest relation between assumed P-frames and assumed averaged B-frames among all the calculated relations for open GoP coding and closed GoP coding.

14. The method of claim 13, wherein the number of frames n, comprises all frames until the next Intra-frame.

15. The method of claim 13, wherein in step c) for every array two relation values are produced as described below to be able to decide between open GoP and closed GoP coding:

i) if the examined video stream comprises of open GoP coding, the assumed added up P-frames of basic pattern BP that is represented by Array[BP], would be located in the last element of said array[BP] and all other elements of said arrays would be occupied by added up B-frames so that the relation $R_O$ for open GoP coding streams is calculated as the last array element divided by the average of all other array elements, with the equation:

$$R_O[BP]=Array[BP][ArraySize[BP]-1]/(\Sigma Array[BP][i]/[ArraySize[BP]-1])$$

with i=0 . . . ArraySize[BP]−2; or ii) if the examined video stream comprises of closed GoP coding, the assumed added up P-frames of the basic pattern BP that is represented by Array[BP], would he located in the first element of said array[BP] and all other elements of said arrays would be occupied by added up B-frames so that the relation $R_C$ for closed GoP coding streams is calculated as the first array element divided by the average of all other array elements, with the equation:

$$R_C[BP]=Array[BP][0]/(\Sigma Array[BP][i]/[ArraySize[BP]-1])$$

with i=1 . . . ArraySize[BP]−1.

16. The method of claim 15, where the largest relation in step d) is found by choosing the maximum of all values $R_C$ and $R_O$ as calculated in claim 14, where, if one of the values $R_C$ comprises the maximum, the sequence can be considered a Closed-GoP coded sequence, and where if one of the values $R_O$ comprises the maximum, the sequence can be considered an Open-GoP coded sequence.

17. The method of claim 13, wherein the GoP-structure associated with the determined array according to step d) is chosen to be the valid estimation of the GoP-pattern, field/frame status and open GoP/closed GoP status of the currently analyzed series of frames.

18. The method of claim 13, wherein after the estimation of the GoP-pattern a further frame type classification is performed wherein the subset of B-frames in the array representing the estimated GoP-structure according to step d) is examined as to whether the relation of array elements that may contain reference B-frames (first element in Open-GoP coding, second element in Closed-GoP coding) to those elements that only may contain non-reference B-frames is larger than a threshold value, which is sufficiently larger than 1, as reference B-frames are assumed to be on average larger than non-reference B-frames, and wherein, if this is the case, said frames are then assumed to be reference B-frames and the estimated GoP-structure is assumed to be a GoP-structure of a so called hierarchical coding sequence.

19. The method of claim 17, further comprising the step of using the estimated GoP structure as an estimate for the following GoP-structures, and using this estimated GoP-structure as aid to detect video frame losses due to packet losses, or to label lost or present frames with their specific frame-type.

* * * * *